June 20, 1933.     W. A. SORG     1,915,170
ENGINE
Filed May 11, 1929
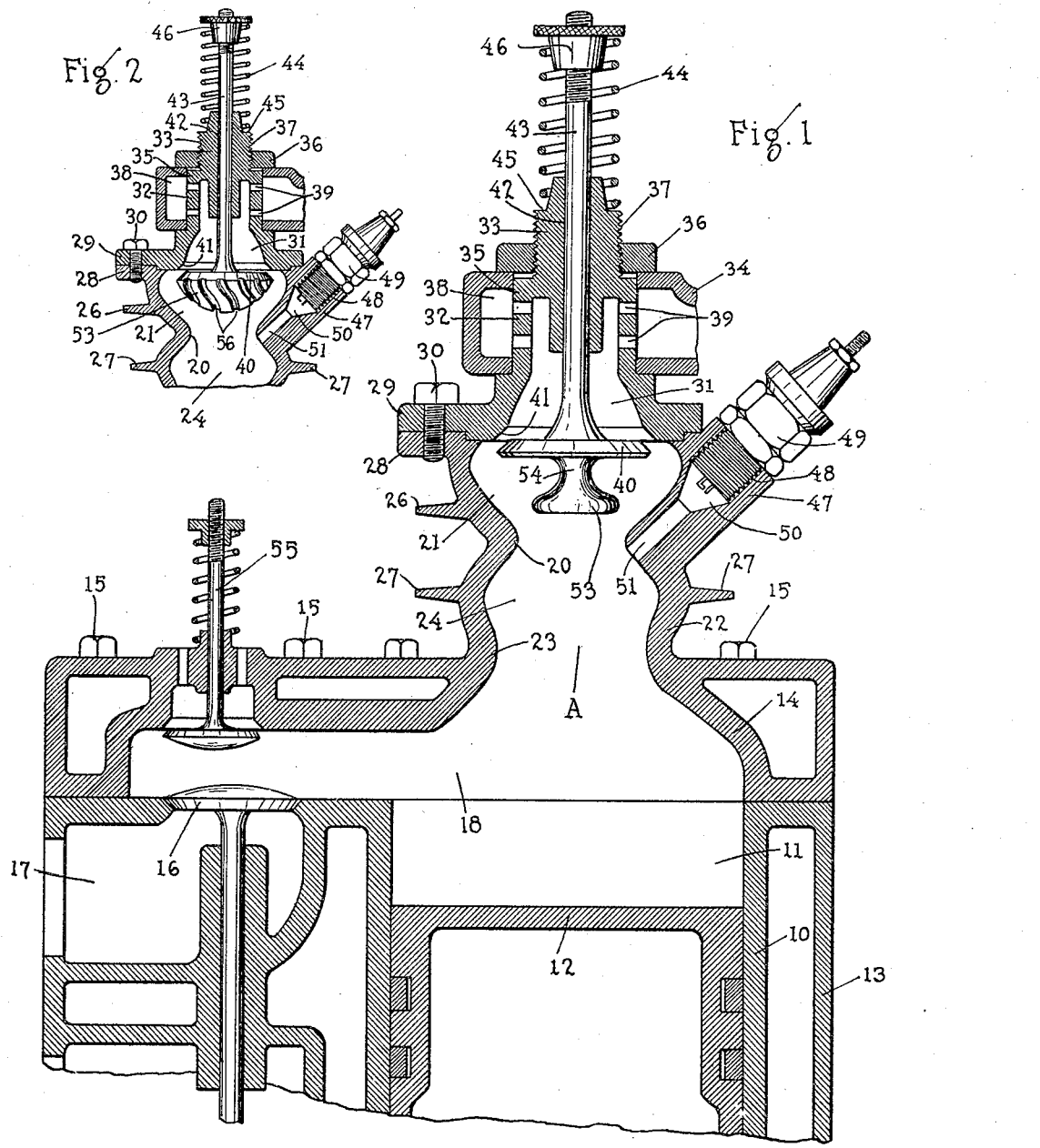
Inventor
William A. Sorg
By Caswell & Sagaard
Attorneys Patented June 20, 1933

1,915,170

UNITED STATES PATENT OFFICE

WILLIAM A. SORG, OF WINONA, MINNESOTA

ENGINE

Application filed May 11, 1929. Serial No. 362,239.

My invention relates to internal combustion engines and particularly to the low compression type fired with an electric spark in which the fuel mixture is first admitted into an auxiliary chamber communicating with the combustion chamber and has for its object to provide means within the auxiliary chamber whereby the fuel within said auxiliary chamber is completely and effectively vaporized, gasified and ignited.

Another object of the invention resides in forming said auxiliary chamber with a valve for admitting the fuel mixture into said chamber and for directing the same against the heated walls of said chamber and in further providing said valve with a protuberance extending therefrom and into said chamber, and in converging the walls of said chamber towards said protuberance to direct the fuel mixture against the same.

A still further object of the invention consists in causing the walls of said chamber to diverge at a locality immediately beyond said protuberance.

A feature of the invention resides in constructing said protuberance with a curved surface.

Another object of the invention resides in providing an ignition chamber for receiving the spark plug of the engine and in providing a reduced passageway communicating with said ignition chamber and auxiliary chambers.

A still further object of the invention resides in bringing the outlet of said passageway near one of the restrictions in said auxiliary chamber so as to create a suction in the ignition chamber upon the flow of the fuel mixture through the auxiliary chamber so as to thoroughly scavenge the ignition chamber.

With the foregoing and other objects in view, which will appear in the following description, the invention resides in the novel combination and arrangement of parts and in the details of construction hereinafter described and claimed.

In the drawing:

Fig. 1 is a longitudinal sectional view of a portion of an engine embodying my invention.

Fig. 2 is a view similar to Fig. 1 of a portion of the engine illustrating a modification of the invention.

In the drawing, I have illustrated only a portion of my improved engine, the remainder of which may be of common construction well known in the art. The engine, as shown, consists of a cylinder block 10 being bored at 11 to receive the usual piston 12. This cylinder block is surrounded by a head 14 which is attached thereto by means of cap screws 15 in the ordinary manner. To the side of the cylinder block is mounted an exhaust valve 16 which closes a passageway 17 leading to the exhaust manifold of the engine, not shown in the drawing.

The cylinder head 14 is formed with a chamber 18 above the piston 12 and valve 16, which provides a clearance space for said piston and serves to conduct the burned gases to the valve 16. Axially disposed relative to the cylinder 10, I provide a tubular casing 22 which forms a vaporizer having an elongated chamber A communicating with the chamber 18, which serves as a vaporizing and ignition chamber. Within the chamber A in casing 22 are provided two constrictions 20 and 23 which form a hopper-like compartment 21 at the top of the casing serving as an initial vaporizing compartment and a bellied compartment 24 immediately below said vaporizing compartment communicating therewith and serving as an auxiliary vaporizing compartment. This initial vaporizing compartment communicates with the adjoining compartment which in turn opens into the chamber 18. Around the chamber 18 is provided a water jacket 25 which serves to keep the same cooled and to prevent the exhaust valve from becoming overheated. It will be noted that the water jacket 25 does not extend up around the casing 22 so that the same is practically not cooled except through two spaced fins 26 and 27 extending circumferentially around said casing. This leaves the interior walls of the vaporizer chambers 21 and 24 relatively hotter than the cooled part of the cylinder and cylinder head which serves to vaporize and gasify the fuel as will be presently described.

The end of casing 22 is open and is formed with a flange 28 extending around the same. A cap 29, serving as a closure for the open end of said casing is bolted to said flange 28 by means of cap screws 30. Issuing from the cap 29 is a sleeve 32 which is closed at its upper end by a boss 33, said sleeve forming a passageway 31 leading to the chamber 21. The intake manifold 34 of the engine is bored at 35 to fit snugly around the sleeve 32 and is held in place thereon by means of a nut 36, which is adapted to be screwed upon threads 37 formed on the boss 33. The fuel mixture provided by the carburetor of the engine, not shown, passes through the intake manifold 34, around an annular space 38 formed in said manifold and through a number of ports 39 in the sleeve 32 and into passageway 31, from which it passes into the chamber A in a manner soon to be described.

The passageway 31 is closed by means of a poppet valve 40 which is seated on a conical seat 41 formed on cap 29 at the mouth of said passageway so that as the valve 40 is opened the fuel mixture is discharged directly into compartment 21. The boss 33 is drilled along its axis at 42 to form a guide-way for the stem 43 of valve 40 which extends beyond said boss and has positioned around it a compression coil spring 44 seated at one end against a shoulder 45 formed on boss 33 and at its other end against a nut 46 mounted on the end of valve stem 43 which spring serves to hold the valve normally closed. In the form of engine illustrated, the intake valve 40 is adapted to be opened by the suction of the engine although it can be readily comprehended that the same may be opened by mechanical means if desired. In the event the valve 40 should break or otherwise drop down, the same falls upon the walls of compartment 21 forming restriction 20 so that said valve is prevented from dropping down into the cylinder and causing injury to the engine by engagement with the piston 12.

Issuing outwardly from the casing 22, I provide a boss 47 which is internally threaded at 48 to receive a spark plug 49 and is formed with a space 50 surrounding the spark gap of said plug and forming an ignition chamber which communicates through a reduced passageway 51 with the interior of the chamber A. When the plug 49 is fired in the ordinary manner, the charge of fuel mixture within the compartment 21 is ignited causing the explosion of the gas within the chamber A. The outlet to the passageway 51 is preferably situated near the restriction 20 which causes a suction in the ignition chamber due to the rapid flow of the fuel mixture through the auxiliary chamber A. This serves to rapidly and effectively withdraw the burned gases from chamber 50 and scavenge said ignition chamber. The length of the passageway can be varied by changing the angularity of the same and the plug proper so as to give the best results.

Upon the valve head 40 is formed a protuberance 53 which is preferably of the form shown and which is connected to the said valve by means of a neck 54. This protuberance extends into the compartment 21 and is centrally situated with respect to the walls thereof to form an annular passageway therebetween. This protuberance serves to properly direct and heat the gases within the various compartments in a manner to most effectively mix and gasify the fuel mixture.

In the operation of my improved engine, on the suction stroke, fuel mixture is drawn into the vaporizing compartment 21 of the chamber A through the orifice formed between the valve seat 41 and valve 40. Due to the effect of the combustion within the chamber A, the walls of casing 22 are maintained at a suitable temperature to cause the volatilization of the fuel globules deposited thereon in the passage of the fuel mixture through the vaporizer. As will be noted, the direction of travel of the incoming fuel mixture as it passes the valve seat 41 is at an angle to the wall of vaporizing compartment 21, which directs the mixture to against said wall where repulsion due to the striking of globules of fuel upon the heated surface of said compartment causes the fuel to leave the same and strike the protuberance 53 where the same action occurs. The fuel upon leaving the compartment 21 is directed by the protuberance 53 into the second compartment 24 through the annular passageway between the constriction 20 and said protuberance and against the walls of said compartment to further gasify the fuel mixture. This causes most, if not all, of the heavier particles of fuel oil suspended in the gas mixture to be precipitated upon the wall of said compartments so as to produce a more thorough mixing and gasification of the fuel mixture than would otherwise be possible.

Along the wall of compartment 21, I provide a number of spiral ridges 52 which cause the incoming fuel mixture to whirl as the same passes through the chamber A. This has the effect of subjecting the fuel mixture to a relatively great extent of wall area of the chamber A and at the same time causes the fuel charge to become thoroughly mixed by being speeded up and whirled in its course of travel. It also causes all of the heavier particles of fuel not deposited on the wall compartment 21 and such particles not vaporized through contact with said wall to be precipitated upon the wall of compartment 24 so that vaporization of the fuel mixture will be complete and the same rendered suitable for efficient combustion in the compartment 21, where the same is ignited as previously mentioned.

As the fresh charge of fuel mixture is drawn into the engine, it scours the surface of the combustion chamber A, due to the formation of the same and completely removes all traces of spent gases therefrom so that a fresh fuel mixture remains in the ignition compartment at the time of ignition.

In addition to the intake valve 40, I employ a similar valve 55 positioned above the exhaust valve 16 which serves to admit a small amount of fresh air, aiding in cooling the exhaust valve, and in forming a strata of air for separating the residue of the burned gases from the incoming fresh charge.

The principal difference between the form of the invention shown in Fig. 2 and that shown in Fig. 1 resides in the shape of the protuberance issuing from the valve 40. In Fig. 2 this protuberance has been illustrated as substantially semi-spherical in form. If desired, the surface of the same can be constructed with spiral grooves 56 to further assist in the gasification of the fuel.

Changes in the specific form of my invention, as herein disclosed, may be made within the scope of what is claimed without departing from the spirit of my invention.

Having described my invention, what I claim as new and desire to protect by Letters Patent is:

1. In an internal combustion engine, means forming a combustion chamber and an elongated auxiliary chamber communicating at one end therewith, means for admitting fuel mixture to said auxiliary chamber at the other end thereof, means forming within said auxiliary chamber a constriction gradually diverging toward said combustion chamber and means forming an ignition chamber communicating with said auxiliary chamber at the diverging portion thereof and on the far side of said constriction with reference to the fuel admitting means, the flow of gases along said auxiliary chamber creating a suction in the auxiliary chamber at the locality of said ignition chamber and causing the withdrawal of a part of the exhaust gases from said ignition chamber.

2. In an internal combustion engine, means forming a combustion chamber and an auxiliary chamber communicating at one end with said combustion chamber and having a plurality of constrictions therein forming a plurality of interconnected compartments, a valve for introducing fuel into the other end of said auxiliary chamber, means forming an ignition chamber communicating with an intermediate compartment of the auxiliary chamber and leading into said compartment in proximity to the constriction of said compartment nearest said valve.

3. In an internal combustion engine, means forming a combustion chamber and an elongated auxiliary chamber communicating at one end with said combustion chamber, a valve for admitting fuel into said auxiliary chamber at the other end thereof, said auxiliary chamber having a constriction therein intermediate the ends thereof, and means forming an ignition chamber communicating with said auxiliary chamber at a locality between the constriction and the combustion chamber and in proximity to said constriction.

In testimony whereof I have affixed my signature to this specification.

WILLIAM A. SORG.